Figure 1:
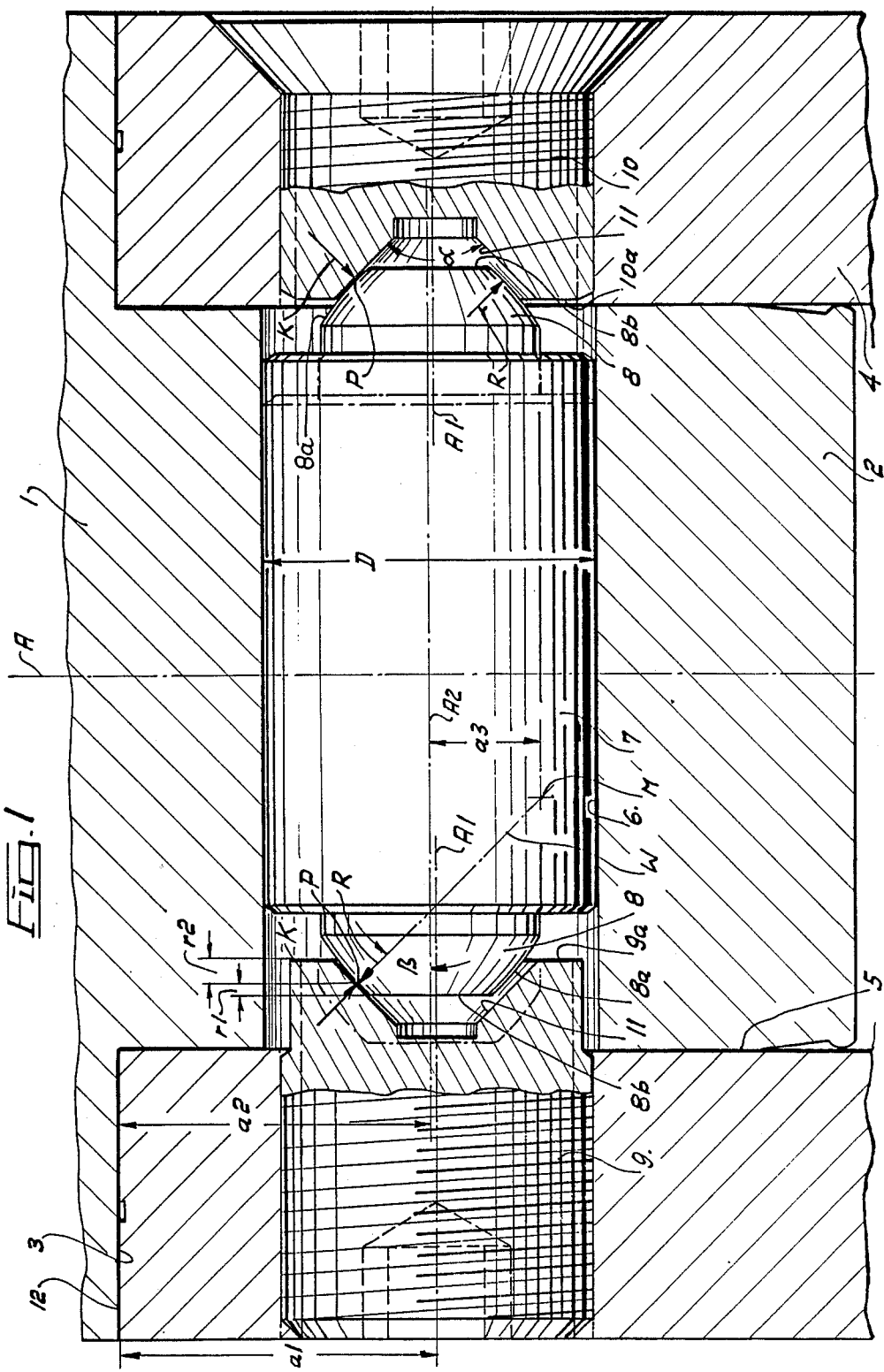

United States Patent [19]

Eckle

[11] Patent Number: 4,755,077
[45] Date of Patent: Jul. 5, 1988

[54] DEVICE FOR CONNECTING TWO TOOL PARTS

[75] Inventor: Otto Eckle, Loechgau, Fed. Rep. of Germany

[73] Assignee: Komet Stahlhalter-und Werkzeugfabrik Robert Breuning GmbH, Besigheim, Fed. Rep. of Germany

[21] Appl. No.: 95,558

[22] Filed: Sep. 10, 1987

[30] Foreign Application Priority Data

Sep. 20, 1986 [DE] Fed. Rep. of Germany ....... 3632045

[51] Int. Cl.$^4$ ............................ B25G 3/20; F16B 2/14
[52] U.S. Cl. .................................... 403/374; 403/379; 403/362; 403/409.1
[58] Field of Search ............... 403/379, 378, 374, 324, 403/362, 323, 409.1, DIG. 8

[56] References Cited

U.S. PATENT DOCUMENTS 2,492,815 12/1949 Robinson, Jr. .................. 403/324 X
3,258,283 6/1966 Winberg et al. ..................... 403/379

FOREIGN PATENT DOCUMENTS 2094191 11/1982 United Kingdom .

Primary Examiner—Andrew V. Kundrat
Attorney, Agent, or Firm—Flynn, Thiel, Boutell & Tanis

[57] ABSTRACT

In a device for connecting two tool parts (1, 4) one tool part (1) is provided with a cylindrical fitting plug (2) which can be inserted in a fitting bore (5) provided in the other tool part (4). The fitting plug (2) has a transverse bore (6) with a radially displaceable tensioning pin (7) therein, which carries extensions (8) at its two ends, which engage in conical recesses (11) of two diametrically opposite tensioning elements (9, 10) arranged in the other tool part (4). The extensions (8) of the tensioning pin (7) have a hemispherical peripheral surface (8a) whose radius of curvature (R) as well as the apex angle ($\alpha$) of the conical recesses (11) are so dimensioned that the hemispherical peripheral surface (8a) and the conical recess (11) touch at a force contact point (P) which lies radially spaced (r1, r2) from the free ends (8b, 9a, 10a) of the extensions (8) and the tensioning elements (9, 10), and that the lines of action (W) of the forces (K) acting at the two force contact points (P) extend at an angle ($\beta$) at approximately 30°–60°, preferably approximately 45°, to the axis (A2) of the transverse bore (6).

8 Claims, 2 Drawing Sheets

DEVICE FOR CONNECTING TWO TOOL PARTS

This invention concerns a device for connecting two tool parts or the like, with a cylindrical fitting plug provided on the one tool part, which is surrounded by an annular surface extending perpendicular to the fitting plug axis, and a fitting bore provided in the other tool part for the reception of the fitting plug, which bore is surrounded by an annular end surface, wherein the fitting plug comprises a transverse bore with a tensioning pin radially displaceable therein, which carries at its two ends tapering, rotationally symmetrical extensions, which engage in conical recesses of two tensioning elements arranged diametrically opposite one another in the other tool part, of which at least one is movable relative to the tensioning pin in the axial direction thereof, and wherein furthermore the spacing of the axes of the conical recesses from the end face is somewhat greater than the spacing of the axis of the transverse bore from the annular surface, so that in the tensioned state, the peripheral surface of each extension is eccentrically located in the corresponding conical recess.

In one such known device (GB No. 2 094 191) the two extensions of the tensioning pin are conical. The tensioning elements are formed as screws and screw radially into corresponding inside threads of the other tool part. To release and tighten up this connecting device, the two screws must be screwed out or in radially a relatively large amount, which requires a correspondingly large number of rotations. In order to simplify the handling, this known device for connecting two tool parts is accordingly so arranged that the tensioning pin only has a cone at one end and has a conical recess at its other end. Cooperating with this conical recess is a tensioning screw which engages with a cone in the conical recess of the tensioning pin. A second tensioning screw, which only serves as an abutment and in whose conical recess the conical extension of the tensioning pin engages, is so screwed into the other tool part that it does not project into the transverse bore. Consequently, for releasing and tightening this device, only operation of the tensioning screw provided with the conical tip is necessary. However since the tensioning pin, on tightening and releasing the connection must always be displaced into or out of the conical recess of the oppositely arranged stationary tensioning screw, the radial displacement of the actuated tensioning screw required for the tightening and releasing is twice as large as in the first described embodiment and correspondingly more rotations of the tensioning screw are required, which takes a correspondingly long time.

The invention is accordingly based on the problem of providing a device for connecting two tool parts of the above-mentioned kind, in which the relative movement between the tensioning element and tensioning pin for tightening and releasing is reduced and therewith a shorter operating time is attained.

This problem is solved according to the invention in that the extensions of the tensioning pin have a hemispherical peripheral surface, whose radius of curvature as well as the apex angle of the conical recesses are so dimensioned that the hemispherical peripheral surface and the conical recess touch at a force contact point which lies radially spaced from the free ends of the extensions and the tensioning elements, and in that the lines of action of the forces acting at the two force contact points extend at an angle of approximately 30° to 60°, preferably approximately 45° to the axis of the transverse bore.

The hemispherically formed projections have a relatively small height in the axial direction of the tensioning pin especially when, in an advantageous embodiment of the invention each extension has a flat on its outer end extending perpendicular to the tensioning pin axis. Because of this small height the relative displacement between the tensioning pin and tensioning element, which is necessary for tightening and releasing the connecting device, is markedly reduced. It is possible to achieve a relative displacement reduced to a half compared with the above described practical embodiments of the known device. Consequently the necessary operating time for the tightening and releasing is reduced to a half. This has particularly significant results in the installation of the device according to the invention in combination with automatic tool change devices. Added to this there is the further advantage that the force contact point at which the hemispherical peripheral surface and the conical surface touch lies spaced both from the free ends of the hemispherical extensions and also from the free ends of the corresponding tensioning elements. In this manner pressure loading at the radially inner ends of the tensioning elements and accordingly edge pressures are avoided, which could lead to deformation of the tensioning elements. Moreover the length of the cylindrical part of the tensioning pin can be somewhat enlarged, which is advantageous for very high reaction forces.

An advantageous embodiment of the invention consists in that the tensioning pin consists of two tensioning pin parts separate from one another, which have oppositely inclined oblique surfaces at their confronting inner ends, and in that between the inner ends there is provided a tensioning wedge with its wedge surfaces lying against the oblique surfaces, the wedge being adjustable in the direction of the axis of the fitting bore.

In this embodiment the short relative displacements between the tensioning pin parts and the outwardly lying, stationarily arranged tensioning elements act particularly advantageously, since the tensioning wedge lying between the two tensioning pin parts can be made relatively small and accordingly the tensioning pin parts have a large guide length.

Further advantageous embodiments of the invention are characterised in the other dependent claims.

Figure 2:
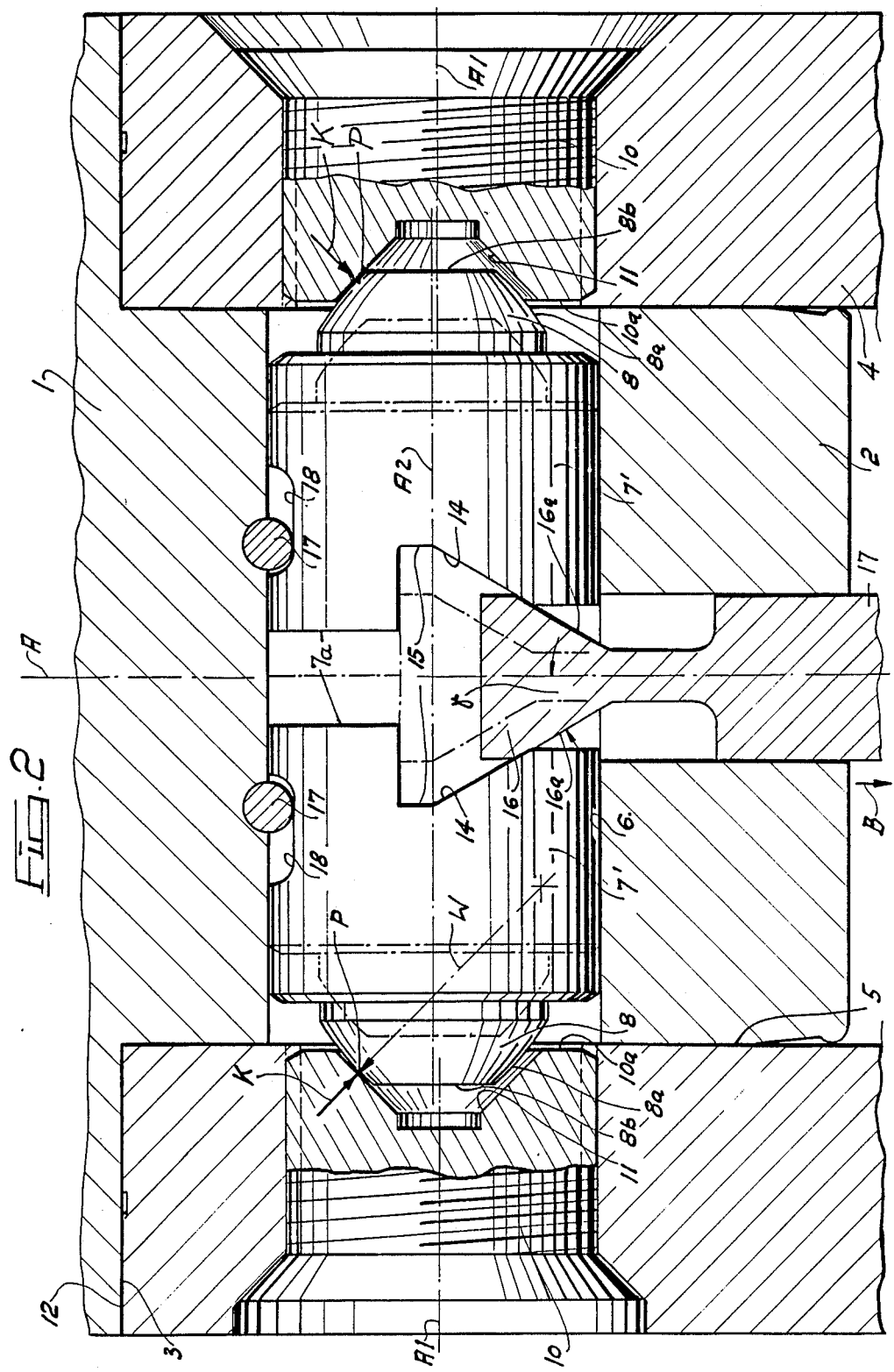

The invention is explained in more detail below with reference to the embodiments represented in the drawings. These show:

FIG. 1 an axial section of a first embodiment,
FIG. 2 an axial section of a second embodiment.

The one tool part 1 comprises a cylindrical fitting plug 2 which is surrounded by an annular surface 3 extending perpendicular to the plug axis A. In the other tool part 4 there is provided a fitting bore 5 for reception of the fitting plug 2. As to the tool part 4, it can be a flange fixedly connected or connectible to the machine tool spindle. The fitting plug 2 comprises a transverse bore 6 in which a tensioning pin 7 is radially displaceable. The tensioning pin 7 is provided at its two ends with extensions 8 which each have a hemispherical peripheral surface 8A. Preferably each extension 8 is provided at its outer end with a flat 8B extending perpendicular to the tensioning pin axis A2.

In the other tool part 4 are arranged two tensioning elements 9, 10 which are formed as tensioning screws in the embodiment shown. Thus the tensioning screw 9 serves as an operating screw for releasing and tightening the connecting device, while the tensioning screw 10 is screwed in fixedly into the other tool part 4. The radial displacement of the tensioning element 9 could also be implemented with the tensioning element 9 fitted slidably in a radial bore of the tool part 4 with an operating member acting on the tensioning element 9 from outside. The other tensioning element 10 could equally be fitted slidably in the tool part 4 or be arranged stationary, for example in a blind bore in the tool part 4.

The two tensioning elements 9, 10 each comprise a conical recess 11, whereby the apex angle of the conical recess can lie between about 60° and 120° and preferably amounts to approximately 90°.

The fitting bore 5 is concentrically surrounded by an annular end surface 12, this annular end surface 12 also being arranged perpendicular to the axis A of the fitting bore 5 or of the fitting plug 2. Furthermore it can be seen from FIG. 1 that the axes A1 of the two tensioning elements 9, 10 have a distance a1 from the end surface 12 which is somewhat larger than the distance a2 of the axis A2 of the transverse bore 6 or of the tensioning pin 7. In this manner it is obtained that, in the tensioned state represented in FIG. 1, the peripheral surface 8a of each extension 8 is in an eccentric position in the corresponding conical recess 11. A contact point P or the contact region are indicated below as the contact or engagement point P, since the tension forces are transmitted at this point from the tensioning elements 9, 10 to the extensions 8 of the tensioning pin 7.

In accordance with the invention it is provided that the force contact points P are arranged at a radial distance r1 from the free ends (flats) 8b of the extensions and also at radial distance r2 from the inner free ends 9a or 10a of the tensioning elements 9 or 10. Accordingly contact and force transfer at the edges between the conical recess 11 and the end surface 9a are strictly avoided as is also a force transfer at the edges between the outer surface 8a and the flat 8b. Unacceptable surface pressures and edge pressures at the said edges are thus avoided. The force transfer takes place where the tensioning elements 9, 10 already possess a relatively large wall thickness. Furthermore the radius of curvature R of the hemispherical peripheral surface 8a and also the apex angle α of the conical recess 11 are so dimensioned that the line of action W, of the forces K acting at the two force contact points P, extend at an angle β of about 30° to 60°, preferably about 45° to the axis A2 of the transverse bore 6.

In principle the hemispherical peripheral surfaces 8a of the extensions 8 could be formed by an exact hemisphere, whose centre of curvature lies on the axis A2 of the tensioning pin 7. However, in order to increase the radius of curvature R of the hemispherical outer surface 8a and thereby reduce the surface pressure between the outer surface 8a and the recess 11, it is advantageous if the radius of curvature R is about 0.8 times the diameter D of the tensioning pin 7, whereby the centre of curvature M of the hemispherical outer surface 8a is located at a distance a3 of approximately one third the diameter D of the tensioning pin from the tensioning pin axis A2. The radius of curvature R can also be made somewhat larger, so that it is approximately the same size as the diameter D of the tensioning pin 7.

When the tool parts 1, 4 are to be released from one another, the tensioning screw 9 is screwed out of the tool part 4 sufficiently to the left that its inner end 9a no longer projects into the fitting bore 5. When one withdraws the fitting plug 2 of the tool part 1 from the fitting bore 5, the tensioning pin is displaced to the left in the transverse bore 6 by the conical recess 11 of the right tensioning screw 10, until it takes up the position in broken lines. After inserting another tool part 1, the left tensioning screw 9 is screwed back into the tool part 4, whereby its recess 11 firstly fits on to the left extension 8 of the tensioning pin 7 located in the broken line position, and then pushes this to the right on further screwing in of the tensioning screw 9, until the right extension 8 engages in the conical recess 11 of the right tensioning screw 11 at the force contact point P. By virtue of the axial displacements of the two axes A1 and A2 the abovementioned eccentric location of the hemispherical outer surfaces 8a in the recesses 11 is guaranteed. On account of the force components of the forces P acting in the direction of the fitting plug axis A, the annular surface 3 of the first tool part 1 is pressed firmly against the end surface 12 of the second tool part 4.

In the embodiment shown in FIG. 2 parts with the same function as in the embodiment shown in FIG. 1 are indicated with the same references. The above description applies insofar as it is relevant to the embodiment shown in FIG. 2. In contrast to the embodiment shown in FIG. 1, in which the tightening and releasing of the connection is effected radially from the outside, in the embodiment shown in FIG. 2 there is provided a central operating arrangement. The tensioning pin consists in this case of two identical tensioning pin parts 7', of which each carries an extension 8 at its outer end which corresponds in its formation to the extension 8 of the above described embodiment. The tensioning elements 10 are formed in this case as fixed screws screwed into the second tool part 4.

Each of the two tensioning pin parts 7' comprises an oblique surface 14 at its inner end 7a whereby the two oblique surfaces are inclined opposite to one another. The angle of inclination α of each oblique surface 14 with respect to the fitting plug axis A amounts advantageously to about 30°. Each oblique surface forms a limiting surface of a transfer groove 15 machined in the inner end of each tensioning pin part 7'. Between the inner ends 7a of the tensioning pin parts 7' is arranged a tensioning wedge 16 which is displaceable by means of the operating rod 17 in the direction of the axis A of the fitting bore 5 or the fitting plug 2. The wedge surfaces 16a of the tensioning wedge 16 cooperating with the oblique surfaces 14 are inclined at the same angle γ with respect to the axis A. When the operating rod 17 is subjected to a tractive force acting in the direction B, which can be effected for example by a traction rod arranged in a machine tool spindle, then the tensioning pin parts are forced radially outwards under the action of the wedge surfaces 16a and the oblique surfaces 14. On engagement of the extensions 8 in the recesses 11 the annular surface 3 of the tool part 1 is again pressed against the end surface 12 of the tool part 4. The transverse rods 17 which engage in grooves 18 in the tensioning pin parts 7' limit the outward displacement of the tensioning pin parts 7' so that the tensioning pin parts 7' cannot fall out of the transverse bore 6, when the tool part 1 is removed from the tool part 4. Moreover the transverse rods 17 prevent rotation of the tensioning pin parts 7'.

I claim:

1. Device for connecting two tool parts or the like, with a cylindrical fitting plug provided on the one tool part, which terminates at one end in an annular surface extending perpendicular to the fitting plug axis, and a fitting bore provided in the other tool part for the reception of the fitting plug, which bore terminates at one end in a radial, annular end surface, wherein the fitting plug comprises a transverse bore with a tensioning pin radially displaceable therein, and which carries at its two ends tapering, rotationally symmetrical extensions, which engage in conical recesses of two tensioning elements arranged diametrically opposite one another in the other tool part, at least one of a tensioning element and at least one extension being movable in the axial direction of the tensioning pin and wherein the spacing of the axes of the conical recesses from the end face is somewhat greater than the spacing of the axis of the transverse bore from the annular surface, so that in the tensioned state, the peripheral surface of each extension is eccentrically located in the corresponding conical recess, wherein each extension of the tensioning pin has a part-spherical peripheral surface, whose radius of curvature as well as the apex angle of the conical recesses are so dimensioned that the part-spherical peripheral surface and the conical recess touch at a contact point which lies radially spaced from the free ends of the extensions and the tensioning elements and wherein the lines of action of the forces acting at the two force contact points extend at an angle of approximately 30° to 60° to the axis of the transverse bore.

2. Device according to claim 1, wherein the said angle is approximately 45°.

3. Device according to claim 1, wherein each extension has a flat at its outer end extending perpendicular to the tensioning pin axis.

4. Device according to claim 1, wherein the radius of curvature of the generator of the peripheral surface is approximately the same size as the diameter of the tensioning pin and the centre of curvature of the generator is spaced from the tensioning pin axis.

5. Device according to claim 4, wherein the radius of curvature is approximately 0.8 times the diameter of the tensioning pin and the distance of the centre of curvature from the tensioning pin axis amounts to approximately $\frac{1}{3}$ of the diameter of the tensioning pin.

6. Device according to claim 4, wherein the apex angle of each conical recess is approximately 90°.

7. Device according to any of claims 1, the tensioning pin consists of two tensioning pin parts separate from one another, which have oppositely inclined oblique surfaces at their confronting inner ends, and wherein a tensioning wedge is provided between the inner ends with its wedge surfaces lying against the oblique surfaces, the wedge being adjustable in the direction of the axis of the fitting bore, for urging the two pin parts radially away from each other.

8. Device according to claim 7, wherein the oblique surfaces are each formed as a flank of a transverse groove machined in the inner end of each tensioning pin part.

* * * * *

UNITED STATES PATENT AND TRADEMARK OFFICE
CERTIFICATE OF CORRECTION

PATENT NO. : 4 755 077
DATED : July 5, 1988
INVENTOR(S) : Otto ECKLE

It is certified that error appears in the above-identified patent and that said Letters Patent is hereby corrected as shown below:

Column 6, line 18; change "according to any of claims 1," to ---according to claim 1,---.

Signed and Sealed this

Twentieth Day of December, 1988

*Attest:*

DONALD J. QUIGG

*Attesting Officer*  *Commissioner of Patents and Trademarks*